Sept. 22, 1936.  W. C. WOOD  2,055,022
APPARATUS FOR COOLING LIQUIDS
Filed May 12, 1933   2 Sheets-Sheet 2

Inventor
Wilbert Copeland Wood
by Geo. T. Rubes
Attorney

Patented Sept. 22, 1936

2,055,022

UNITED STATES PATENT OFFICE 2,055,022

APPARATUS FOR COOLING LIQUIDS

Wilbert Copeland Wood, Toronto, Ontario, Canada

Application May 12, 1933, Serial No. 670,628

7 Claims. (Cl. 62—101)

This invention relates to a method of refrigeration and an apparatus for carrying out the same. The method refers particularly to a tank type refrigerating apparatus in which a refrigerated liquid is employed for abstracting heat from a substance which it is desired to quickly chill and maintain at a lower uniform temperature. For example, in the preservation of milk for consumption where public health laws are enforced, it is required that the milk be chilled to a temperature of 50° F. or lower as quickly as possible after it has been drawn from the cow, and that every precaution be taken to keep the milk clean and free from contamination.

A common type of mechanical refrigerating apparatus employed in the preservation of milk awaiting shipment consists of a tank of a desired capacity lined with watertight material for holding a refrigerated liquid, into which the cans of milk are immersed. Attached to the sides and the ends of the tank are coils through which circulates a refrigerant such as ammonia, flowing under pressure from an external motor driven compressor, the coils being protected against injury by racks placed between the coils and the main body of the tank. The tank is filled with a liquid such as water, where temperatures below 32° F. are not required, to a desired depth and the containers placed therein. The liquid is refrigerated by circulating a refrigerant through the coils thus absorbing heat from the refrigerated liquid which in turn absorbs heat from the substances in the containers. A disadvantage of this type of cooling device is that the circulation of the refrigerated liquid throughout the tank is dependent on convection currents which result in the refrigerated liquid being at extremely low temperatures near the coils usually forming ice around the coils, which acts as an insulator between the refrigerated liquid and the refrigerant. The formation of ice and the lack of circulation throughout the tank results in a low efficiency of the refrigerating unit and a slow cooling of the milk in the containers, in addition the tank is difficult to clean and a large part of the usable space is taken up with the refrigerating coils.

The object of this invention is to provide a method and apparatus for the uniform refrigeration of substance, which is highly efficient and which may be entirely automatic in operation, which is inexpensive as to installation and operation, which allows the maximum space of the cooling tank to be available for use, which provides perfect circulation and a resulting rapid and uniform lowering of temperature in all parts of the cooling medium, and the substance immersed therein and which eliminates any places in the tank which would be difficult to clean. The manner in which this is accomplished will be understood by having reference to the following description and the apparatus illustrated in the accompanying drawings in which:—

Like characters of reference refer to like parts throughout the specification and drawings.

Figure 1:
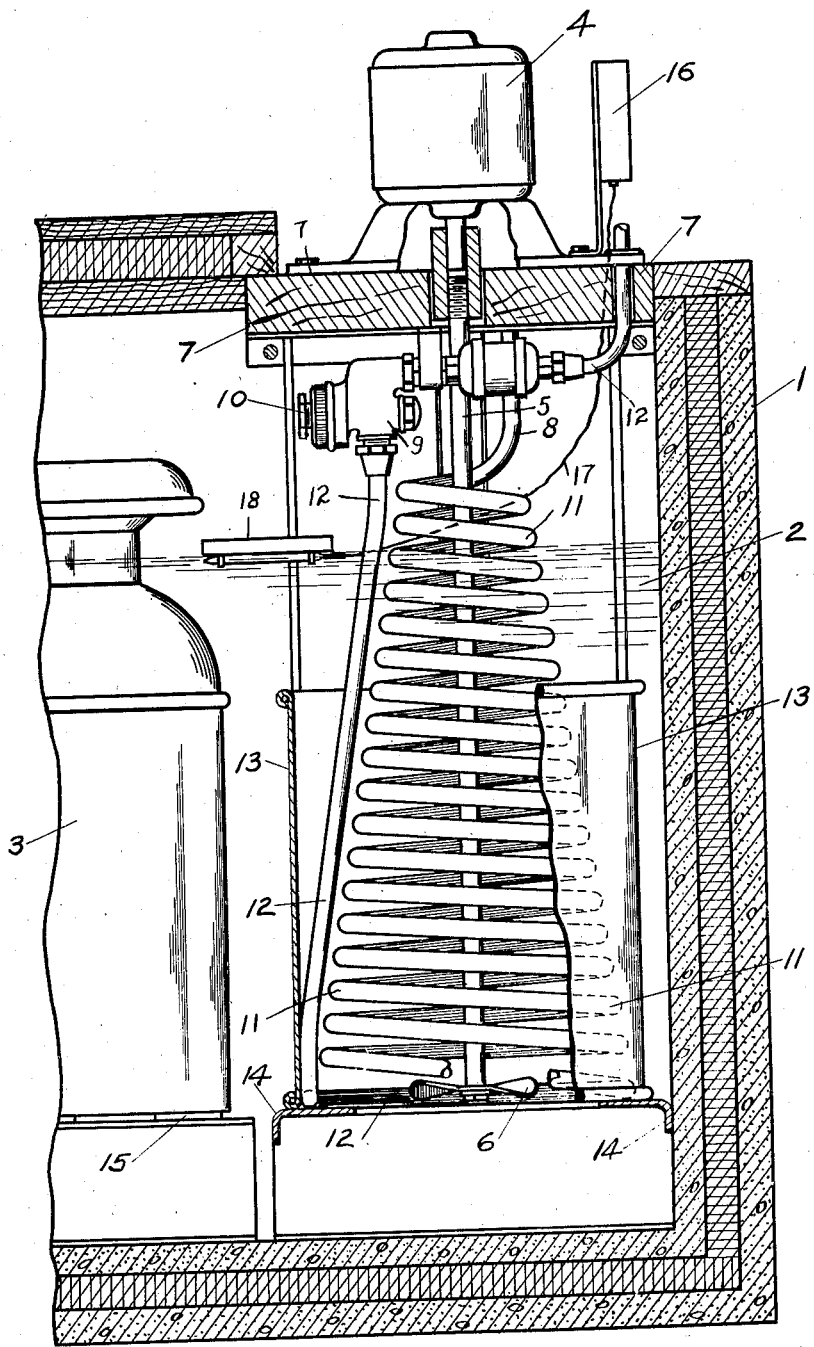
Fig. 1 is a sectional view of my apparatus.
Figure 2:
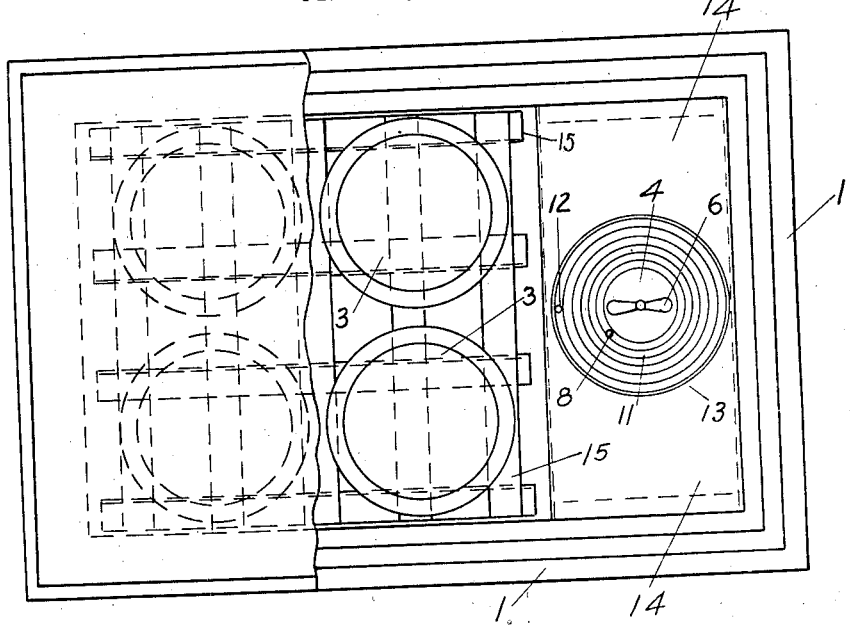
Fig. 2 is a plan view of a cooling tank containing my apparatus.
Figure 3:
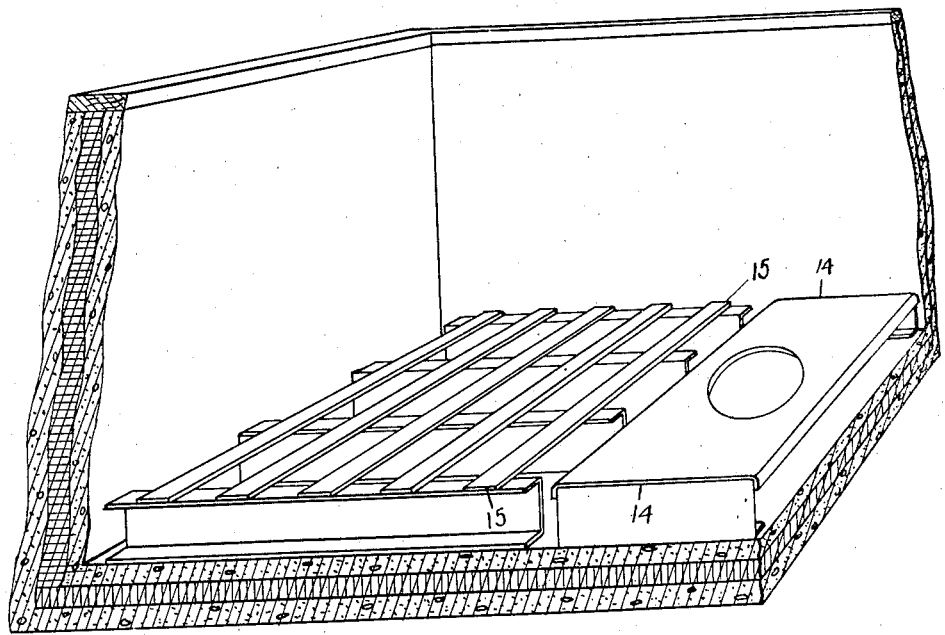
Fig. 3 is a side sectional view showing the combined rack and baffle at the bottom of the tank.

In the preferred embodiment of my invention illustrated in the drawings the tank 1, suitably insulated and lined with watertight material, is filled with a cooling medium 2 such as water, where temperatures below 32° F. are not desired. The manner in which the cooling medium is maintained at a low uniform temperature is as follows:—Refrigerant containing coils 11 are suspended into the cooling medium. Refrigerant such as liquid sulphur dioxide is circulated through the coils gradually returning to its normal gaseous state as it extracts heat from the cooling medium contacting the outside surface of the coils, the refrigerant is re-liquefied by means of a motor driven compressor and condenser (not shown) and the rate of flow of refrigerant through the coils is controllable at the expansion valve 9 by means of the screw 10. The upper end of the coils 11 is secured to a bridge 7 mounted on the sides of the tank 1 and so constructed that it may be located in any convenient part of the tank so that the coils may take up the least amount of useable space in the cooling medium with the most efficient refrigerating effect. The cooling medium 2 is brought in contact with the surface of the refrigerant containing coils 11 and circulated uniformly throughout the body of the tank by means of a propeller 6 which is secured to the lower end of the shaft 5 extending preferably through the center of the refrigerating coils 11, the upper end being coupled to the driving means, in this case the motor 4 mounted on the bridge 7. I preferably maintain the propeller 6 in line with the lower extremity of the coils 11 the curvature of the blade being such as to draw the liquid downward. The casing 13 which surrounds the refrigerating coils 11 serves a dual purpose to protect the coils from damage and also act as a channel to assist in directing the flow of the cooling medium from the surface downwards in contact with the surface of the coils 11 to prevent any short circuiting of the flow. The upper rim of the casing 11 while illustrated in the drawings as being slightly below the surface of the cooling medium may extend above and the cooling medium drawn into the casing at any desired level by means of inlet ports located at that level, or otherwise modified.

The flow of the refrigerated cooling medium is directed from the lower extremity of the casing by means of baffles 14 under the rack 15 resting on the bottom of the tank designed to direct the circulation of the refrigerated cooling medium to rise uniformly in all parts of the tank. A thermostat 18 contacting the highest temperature cooling medium by floating on the surface operates the automatic switch 16 which in turn controls the operation of the refrigerating unit (not shown) and the motor 4. If desired, of course, the propelling means and refrigerating unit may be operated independently of each other.

The temperature of the refrigerated liquid in the tank may be maintained constantly within any desired limits, in this instance from 37° F. to 40° F. This is done automatically by means of the thermostatic bulb 18 floating on the surface of the cooling medium and operating the automatic switch 16 which operates the compressor motor and the motor 4 driving the propeller 6 attached to the shaft 5. The milk in the containers 3 at a temperature of approximately 90° F. is placed in the tank 1 containing the refrigerated liquid 2, and immediately a transfer of heat takes place through the walls of the containers 3 to the refrigerated liquid 2. The higher temperature refrigerated liquid rises to the surface where it immediately comes in contact with the thermostatic bulb 18, operating the automatic switch 16 which operates the compressor motor, starting the refrigerant circulating through the coils, and also operates the motor 4 driving the shaft 5 and the propeller 6, thus drawing the liquid 2 on the surface of the bath to the refrigerating coils 11, and downwards from the outside to the inside thereof, and in direct contact with the refrigerating coils 11 finally expelling the refrigerated medium from the bottom of the coil where the circulation is directed by the baffles 14 and the channels of the rack 15 to all parts of the body of the cooling medium circulating under and around all the containers resulting in an uniform chilling of the substance in the containers. It will be apparent that the first sudden chilling of the milk is due primarily to the action of circulating the cooling medium under and around all the containers, thus maintaining a uniform temperature in all parts of the refrigerated liquid in place of having a higher temperature close to the containers where no means of circulation is employed. Without the means for providing uniform circulation in all parts of the refrigerated liquid the chilling of the substance in the containers would require a much longer period of time, being entirely dependent on the convection currents carrying away the higher temperature refrigerated liquid to be replaced by the lower temperature refrigerated liquid. The first sudden chilling of the substance to about 50° F. in the containers usually requiring less than an hour is due primarily to the transfer of the heat from the milk to the refrigerated liquid causing a gradual rise of temperature of the refrigerated liquid. As the differential in temperatures between the refrigerated liquid and the milk in the containers narrows, the abstraction of heat by the coils gradually becomes equal to and then exceeds the transfer of heat from the milk to the refrigerated liquid, and continues to lower the temperature of the refrigerated liquid and the milk to the predetermined temperature.

It will be clearly understood that while the various means such as the racks, baffles and casing illustrated to direct the circulation of the cooling medium to increase the efficiency of the apparatus as a whole they are not absolutely essential and can be eliminated either individually or entirely. Also other means may be associated with the propeller to direct the circulation which may be effected in either direction without departing from the scope of this invention.

Having thus fully described my invention what I claim as new and desire to secure by Letters Patent is:

1. A tank type refrigerating apparatus in which a refrigerated liquid maintained in cyclic circulation is employed to quickly abstract heat from a substance to be chilled, which comprises a tank adapted to receive the substance to be chilled and the refrigerated liquid, refrigerant containing coils extending into the refrigerated liquid within the tank, propelling means for maintaining the refrigerated liquid in cyclic circulation within the tank bringing it in contact with the exposed surfaces of the refrigerant containing coils, and means for automatically stopping and starting the flow of refrigerant in the coils and the propelling means when the temperature of the refrigerated liquid falls to or rises above predetermined limits which comprises a thermostat floating on the surface of the refrigerated liquid operating an automatic switch which in turn operates the motors driving the propelling means and the refrigerating unit controlling the flow of refrigerant in the coils.

2. A tank type refrigerating apparatus in which a refrigerated liquid maintained in cyclic circulation is employed to quickly abstract heat from a substance to be chilled which comprises a tank adapted to receive the substance and the refrigerated liquid, refrigerant containing coils extending into the refrigerated liquid, a casing open at both ends surrounding said coils, propelling means for maintaining the refrigerated liquid in cyclic circulation within the tank and drawing it to and through the casing in contact with the exposed surfaces of the refrigerant containing coils, and means for automatically stopping and starting the flow of the refrigerant in the coils and the propelling means when the temperature of the refrigerated liquid falls to or rises above predetermined limits which comprises a thermostat floating on the surface of the refrigerated liquid operating an automatic switch which in turn operates the motors driving the propelling means and the refrigerating unit controlling the flow of refrigerant in the coils.

3. A tank type refrigerating apparatus in which a refrigerated liquid maintained in cyclic circulation is employed to quickly abstract heat from a substance to be chilled which comprises a tank adapted to receive the substance to be chilled and the refrigerated liquid, refrigerant containing coils extending into the refrigerated liquid, a casing open at both ends surrounding said coils, propelling means for maintaining the refrigerated liquid in cyclic circulation within the tank and drawing it to and through the casing in contact with the exposed surfaces of the refrigerant containing coils, a baffle at the bottom of the casing to direct the circulation of the refrigerated liquid under a rack having channels and cross members supported on the bottom of the tank, the channels to direct the circulation of the refrigerated liquid uniformly to all parts of the tank to rise under and around the substance to be chilled, and means for automatically stopping and starting the flow of refrigerant in the coils and the propelling means when the temperature of the refrigerated liquid falls to or rises above predetermined limits which comprises a thermostat floating on the surface of the refrigerated liquid operating an automatic switch which in turn operates the motors driving the propelling means and the refrigerating unit controlling the flow of refrigerant in the coils.

4. In a tank type refrigerating apparatus means for refrigerating and maintaining in mass circulation a liquid which when refrigerated is employed to quickly abstract heat from a substance immersed therein which comprises a container adapted to receive the substance to be chilled and the liquid, refrigerant containing coils extending into said liquid, a casing surrounding said coils, propelling means for maintaining the liquid in mass circulation in contact with the exposed surfaces of the refrigerant containing coils, a baffle at the lower extremity of the casing to direct the circulation of the liquid under a rack having channels and cross members supported on the bottom of the container to direct the circulation of the liquid uniformly to all parts of the tank to rise under and around the substance to be chilled.

5. A tank type refrigerating apparatus in which a refrigerated liquid maintained in mass circulation is employed to quickly abstract heat from a substance to be chilled, which comprises a tank adapted to receive the substance to be chilled and the refrigerated liquid, refrigerant containing coils extending into the refrigerated liquid within the tank, propelling means for maintaining the refrigerated liquid in mass circulation within the tank bringing it in contact with the exposed surfaces of the refrigerant containing coils, and means for automatically stopping and starting the flow of refrigerant in the coils and the propelling means when the temperature of the refrigerated liquid falls to or rises above predetermined limits which comprises a thermostat floating on the surface of the refrigerated liquid operating an automatic switch which in turn operates the motors driving the propelling means and the refrigerating unit controlling the flow of refrigerant in the coils.

6. A tank type refrigerating apparatus in which a refrigerated liquid maintained in mass circulation is employed to quickly abstract heat from a substance to be chilled which comprises a tank adapted to receive the substance and the refrigerated liquid, refrigerant containing coils extending into the refrigerated liquid, a casing open at both ends surrounding said coils, propelling means for maintaining the refrigerated liquid in mass circulation within the tank and drawing it to and through the casing in contact with the exposed surfaces of the refrigerant containing coils, and means for automatically stopping and starting the flow of the refrigerant in the coils and the propelling means when the temperature of the refrigerated liquid falls to or rises above predetermined limits which comprises a thermostat floating on the surface of the refrigerated liquid operating an automatic switch which in turn operates the motors driving the propelling means and the refrigerating unit controlling the flow of refrigerant in the coils.

7. A tank type refrigerating apparatus in which a refrigerated liquid maintained in mass circulation is employed to quickly abstract heat from a substance to be chilled which comprises a tank adapted to receive the substance to be chilled and the refrigerated liquid, refrigerant containing coils extending into the refrigerated liquid, a casing open at both ends surrounding said coils, propelling means for maintaining the refrigerated liquid in mass circulation within the tank and drawing it to and through the casing in contact with the exposed surfaces of the refrigerant containing coils, a baffle at the bottom of the casing to direct the circulation of the refrigerated liquid under a rack having channels and cross members supported on the bottom of the tank, the channels to direct the circulation of the refrigerated liquid uniformly to all parts of the tank to rise under and around the substance to be chilled, and means for automatically stopping and starting the flow of refrigerant in the coils and the propelling means when the temperature of the refrigerated liquid falls to or rises above predetermined limits which comprises a thermostat floating on the surface of the refrigerated liquid operating an automatic switch which in turn operates the motors driving the propelling means and the refrigerating unit controlling the flow of refrigerant in the coils.

WILBERT COPELAND WOOD.